UNITED STATES PATENT OFFICE.

LEANDER ANDERSON, OF RICHMOND, ASSIGNOR OF ONE-HALF HIS RIGHT TO WILLIAM P. FRENCH, OF WASHINGTON, IOWA.

IMPROVEMENT IN MEDICAL COMPOUNDS OR LINIMENTS.

Specification forming part of Letters Patent No. 155,820, dated October 13, 1874; application filed April 4, 1874.

*To all whom it may concern:*

Be it known that I, LEANDER ANDERSON, of Richmond, in the county of Washington and State of Iowa, have invented a certain Compound, called "Anderson's Erysipelas Remedy," the use and mode of composition of which compound will be fully described in the subjoined specification.

This invention relates to that class of remedies used as a cure or antidote for cutaneous diseases, such as erysipelas, ringworm, tetter or surface poison, salt-rheum, and similar disorders of the skin.

The ingredients of my erysipelas remedy are: (1) one part of oil of sweet fern; (1) one part of carbolic acid; (3) three parts of cinchona; (6) six parts of gum-arabic; and (12) twelve parts of sal ammoniac.

These ingredients are mixed with "soft" water in the proportion of one pint of water to one ounce of sal ammoniac. When dissolved it is ready for use.

My erysipelas remedy is applied externally until the disease is subdued. It may be applied with cloths saturated with the compound, or in any other convenient manner.

After long experience in the use of my erysipelas remedy, I have invariably found that it will effectually cure erysipelas, ringworm, tetter or surface poison, salt-rheum, and all similar cutaneous diseases. As there are no caustics or other ingredients injurious to the skin used, it cures the disorder without pain.

I claim as my invention—

A compound comsisting of oil of sweet fern, carbolic acid, cinchona, gum-arabic, and sal ammoniac, combined substantially as and for the purpose specified.

In witness that I claim the foregoing I have hereunto set my hand this 23d day of March, 1874.

LEANDER ANDERSON.

In presence of—
G. C. MONTGOMERY,
W. E. MONTGOMERY.